United States Patent [19]

Iwano et al.

[11] Patent Number: 4,901,253
[45] Date of Patent: Feb. 13, 1990

[54] COORDINATE MEASURING INSTRUMENT AND METHOD OF GENERATING PATTERN DATA CONCERNING SHAPE OF WORK TO BE MEASURED

[75] Inventors: Hideo Iwano, Kawasaki; Soichi Kadowaki, Tokyo, both of Japan

[73] Assignee: Mitutoyo Corporation, Tokyo, Japan

[21] Appl. No.: 158,292

[22] Filed: Feb. 19, 1988

[30] Foreign Application Priority Data

Feb. 23, 1987 [JP] Japan .................................. 62-40565
Feb. 23, 1987 [JP] Japan .................................. 62-40566
Feb. 24, 1987 [JP] Japan .................................. 62-42149

[51] Int. Cl.⁴ ...................... G05B 19/42; G06F 15/60
[52] U.S. Cl. .................................. 364/522; 364/521; 364/550
[58] Field of Search ............... 364/512, 518, 520, 521, 364/522, 488, 550, 149; 901/16–18

[56] References Cited

U.S. PATENT DOCUMENTS 4,385,361 5/1983 Moates ................................ 364/520

FOREIGN PATENT DOCUMENTS 0132947 2/1985 European Pat. Off. .
0199961 12/1986 European Pat. Off. .
2194367 3/1988 United Kingdom .

Primary Examiner—David L. Clark
Assistant Examiner—H. R. Herndon
Attorney, Agent, or Firm—Flynn, Thiel, Boutell & Tanis

[57] ABSTRACT

A coordinate measuring instrument which measures the size and other factors of a work from amount of three-dimensional relative movement between a probe sensor and the work, as well as a method for generating a reference work shape pattern data which is to be used in automatic measurement. The coordinate measuring instrument has a CAD part for converting design data into shape pattern data, a measuring part for generating, by adding measuring conditions to the shape pattern data, measurement information which includes instructions concerning measuring procedure to be output to a controller, and measuring procedure instruction means having a system for setting and inputting the measuring conditions, whereby an optimum measuring program can be formed without necessitating any reference work or actual work. The method of generating the shape pattern data includes the steps of generating measurement plane shape patterns by effecting sweeping with basic lines and suitably combining the measurement plane shape patterns so as to form a three-dimensional pattern.

9 Claims, 7 Drawing Sheets

FIG. 3

CAD PART MENU

| | GENERATION/ OPERATION OF PARAMETRIC PATTERN | INQUIRY ABOUT GEOMETRICAL DATA |
|---|---|---|
| GENERATION OF PLANE | OPERATION OF PLANE | NAMING AND COMMENTING |
| GENERATION/ OPERATION OF LINE | RESERVATION | MOVE/COPY OF IMAGE |
| GENERATION/ OPERATION OF POINT | CAD PART FILE OPERATION | DELETION OF PATTERN |
| OPERATION OF GROUP OPERATION COORDINATES SYSTEM | OPERATION OF DISPLAY SCREEN | SWITCHING OF COORDINATES SYSTEM |
| | CANCEL | CORRECTION |

MEASURING PART MENU

| GENERATION/ OPERATION OF TOLERANCE | RESERVATION | EVALUATION OF MEASUREMENT |
|---|---|---|
| USER'S PROGRAM | START/END | MEASURING OPERATION |
| DATA PROCESSING | MEASURING OPERATION | EDITION |
| MACRO GENERATION | MICRO CITATION | ZOOM UP/ DOWN |
| TEMPORARY DELETION OF PATTERN | SCROLL UP/ DOWN AND LEFT/RIGHT | |
| INTERRUPTION | CONFIRMATION | |

(CONTROL BUTTON)

(LOCAL DISPLAY CONTROL)

FIG. 4(A)   FIG. 4(B)
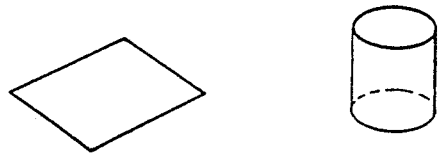
FIG. 4(C)   FIG. 4(D)
FIG. 5(A)   FIG. 5(B)
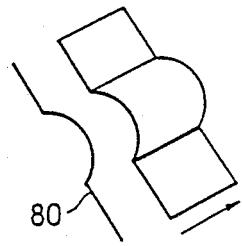 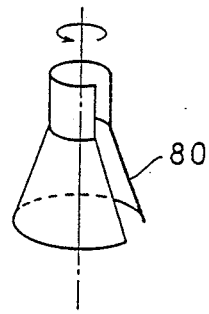

FIG. 6
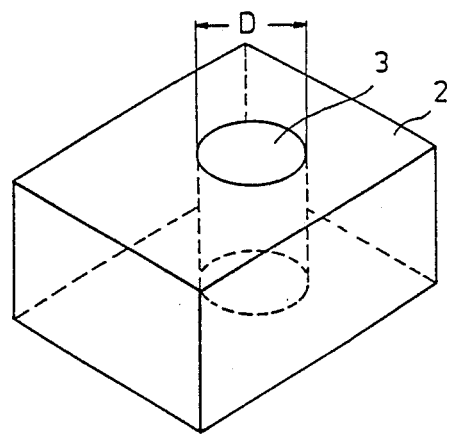
FIG. 7(A)  FIG. 7(B)  FIG. 7(C)
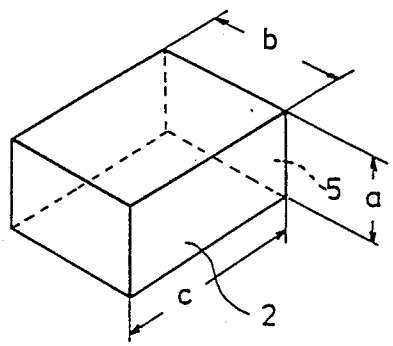 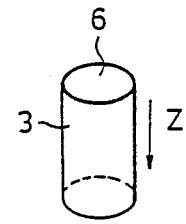 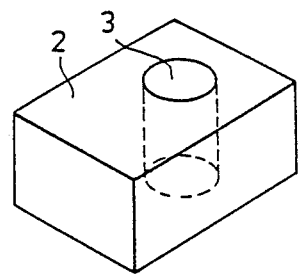

COORDINATE MEASURING INSTRUMENT AND METHOD OF GENERATING PATTERN DATA CONCERNING SHAPE OF WORK TO BE MEASURED

BACKGROUND OF THE INVENTION

1. Field of the Invention

The present invention relates to a coordinate measuring instrument which is composed of a main part and a controller, wherein the main part in which a work to be measured and a probe sensor are three-dimensionally movable relative to each other, while the controller is capable of driving the main part in accordance with a predetermined procedure so as to measure the shape and size of the work by making use of the amount of relative movement between the work and the probe sensor. The invention also is concerned with a method of generating pattern data concerning the shape of the work to be measured.

2. Description of the Related Art

FIG. 10 shows a typical known coordinate measuring instrument. The measuring instrument is composed mainly of a main part 31 and a controller 51. The main part 31 includes various parts such as a base 32, supporting posts 34, 34 on both sides of the base 32, a beam 35 extending between both supporting posts 34, 34, an X-slider 36 capable of sliding in X-direction along the beam 35, a Z-guide box 37 integrally attached to the X-slider 36, a spindle 38 guided by the Z-guide box for sliding motion in Z-direction, a work table 42 reciprocally movable on the base 1 in Y-direction, Y-direction driving means and Y-direction displacement detector placed under the work table 42, side plates 33, 33 and bellows 46 for shielding the Y-direction driving means and the Y-direction displacement detector from dusts and other contaminants, and a touch signal probe 44 attached to the lower end of a spindle 38 and provided with a sensor 45. A reference numeral 43 designate a probe holder frame capable of holding a plurality of types of touch signal probes 44, 44, 44. Although not shown, an automatic probe changer is provided to automatically change the touch signal probe 44 on the spindle 38.

The controller 51 is constituted mainly by a control unit 52, a console 53 for allowing various setting and instructing operations, and an output system 54 which is provided with a typewriter and/or a CRT for outputting the result of the measurement. The control unit 52 stores predetermined measuring programs which provide procedures for determining shape and size of a work 1 on the work table 42, by making use of relationships existing between the probe sensor 45 and the work 1, e.g., positions or points where they are mutually engaged, number of the points where they are engaged, and the amount of relative movement between the work 1 and the probe sensor 45.

In operation, the work 1 to be measured is mounted on the work table 42 and a predetermined measuring program corresponding to the type of the work 1 to be measured is set in the control unit 52 of the controller 51, whereby the apparatus gets ready for the automatic measuring operation. As the automatic measuring operation is commenced, the work table 42, X-slider 36 and the spindle 38 are driven in a predetermined procedure, so that the probe sensor 45 and the work 1 to be measured are three-dimensionally moved relative to each other. During this relative movement, the probe sensor 45 and the work 1 to be measured are made to be engaged with each other. In this case, since the probe 44 is of the touch signal type, the term "engaged with" should be interpreted as indicating "directly contacted by" each other. When the probe sensor 45 and the work 1 are brought into contact with each other, the probe 44 produces a touch signal. By using such touch signals obtained at numerous points of contact between the probe sensor 45 and the work 1, it is possible to determine the amount of relative movement between the probe sensor 45 and the work 1 and, hence, to precisely determine the shape, size and other factors of the work 1 by the measuring program.

The basic construction and the operation principle are the same also in the cases where the main part 31 is modified such that the work table 42 is fixed rather than being moved and where the probe sensor 45 is of an optical sensor capable of recognizing the work without making direct contact therewith.

The described coordinate measuring instrument, however, suffers from the following problems.

For attaining a prompt and accurate automatic measuring operation by this coordinate measuring instrument, it is essential that the measuring procedure corresponding to the type of the work 1 is programmed and stored. The programming of the measuring procedure has been conducted typically by teaching method or playback method. For instance, such a known programming method comprises the steps of preparing a reference work which is a precisely finished model of the work 1 to be measured, setting the reference work on the work table, operating the main part 31 manually or semi-automatically so as to relatively move the reference work and the probe sensor 45 to enable them to be engaged with each other thus executing the measuring procedure, and reading and storing data such as amount of the relative movement, positions and number of the points where they are engaged, and so forth, whereby the program is formed by using such numerical data. Thus, the programming of the measuring procedure essentially requires preparation of the reference work, with the result much time and money are spent uneconomically particularly when a multiplicity of reference works have to be prepared to comply with demand for measurement of a multiplicity of types works. Obviously, the necessity for the preparation of such reference works seriously impairs the efficiency of the measurement.

In recent years, systems such as CAD (computer-aided design) and CAM (computer-aided manufacture) are becoming popular for automation of designing and manufacturing processes with the aid of computers. Such computer-aided systems, however, have been excluded from the process for measurement and inspection of the products, due to various restrictions from the user's point of view. Thus, numerical data available in the design and manufacture could not be utilized in the measurement and inspection of products. This undesirably limits the efficiency of production including design, manufacture and inspection. In addition, the coordinate measuring instrument may fail to effectively function depending on the type of the work to be measured.

As explained above, the programming of the measuring procedure has to be done for each type of the work to be measured by employing a reference work. The process for building up the numerical data, however, tends to vary according to the individual who manipulates the measuring instrument, with the result that the precision and the efficiency are impaired. In addition, the programming is necessary for each type of the work to be measured, even if the difference in the shape and size between different types of work are slight.

SUMMARY OF THE INVENTION

Accordingly, an obJect of the present invention is to provide a coordinate measuring instrument incorporating a measuring procedure instruction means which is capable of promptly and accurately forming the measuring program through generation of shape pattern data corresponding to the shape of the work to be measured, without requiring formation of a reference work, as well as a method of generating the shape pattern data of the work to be measured.

On the knowledge that the problems encountered by the known arts are all attributable to the fact that the formation of the measuring program relies upon a reference work, the present invention aims at making it possible to form the program of the measuring procedure for each type of the work even before a sample work is actually formed and without necessitating preparation of a reference work.

To this end, according to one aspect of the present invention, there is provided a coordinate measuring instrument having a main part capable of effecting three-dimensional relative movement between a work to be measured and a probe sensor, and a controller capable of driving the main part in accordance with a predetermined procedure and measuring the shape and size of the work by making use of the amount of relative movement between the work and the probe sensor, the coordinate measuring instrument comprising: measuring procedure instruction means including a coordinate measurement supporting system composed of a CAD part having a pattern processing function for generating pattern data corresponding to the shape of the work through conversion from given design data, and a measuring part for generating, on the basis of the shape pattern data generated by the CAD part and taking into account measuring conditions, measurement information concerning the measuring procedure to be input to the controller, the measuring procedure instruction means further including an input system for setting the measuring conditions in the coordinate measurement supporting system; whereby the measuring procedure is programmed without necessitating any process for actually measuring a reference work.

According to the invention, therefore, the pattern processing function of the CAD part of the measurement supporting system automatically generates a shape pattern data corresponding to the shape of the work can be automatically generated by reading, from the CAD/CAM, the pattern data stored as design data, while inputting, through the input system, measuring conditions such as the object of measurement evaluation, positions and number of the measuring points and so forth. At the same time, the measuring part of the measurement supporting system can generate measuring condition information including the paths of relative movement between the work and the probe sensor, by making use of the shape pattern data generated by the pattern processing function of the CAD part. Therefore, the coordinate measuring instrument of the present invention can automatically form the program of the measuring procedure solely on the basis of the measurement data derived from the measurement supporting system, without requiring any reference work, not to mention an actual work.

The invention also provides a method of generating shape pattern data of a work to be measured by a coordinate measuring instrument, on a recognition that a key to the effectiveness of the measuring procedure instruction means is to generate a shape pattern data which corresponds to the shape of the work to be measured.

Thus, according to another aspect of the present invention, there is provided a method of generating shape pattern data of a work to be measured by a coordinate measuring instrument which has measuring procedure instruction means for giving instructions concerning the measuring procedure through generation of measurement information in accordance with the shape pattern data formed on the basis of given design data, the method comprising: generating measurement plane shape patterns by effecting a sweep with a basic line through a translational motion or rotation of the basic line; and combining the measurement plane shape patterns so as to build up a three-dimensional pattern thereby generating shape pattern data corresponding to the shape of the work to be measured.

In another form of this aspect of the present invention, there is provided a method of generating shape pattern data of a work to be measured by a coordinate measuring instrument which has measuring procedure instruction means for giving instructions concerning the measuring procedure through generation of measurement information in accordance with the shape pattern data formed on the basis of given design data, the method comprising: generating and registering basic patterns by using the sizes of patterns as parameters; generating measurement plane shape patterns by giving definite values to part or all of the size parameters; and combining the measurement plane shape patterns thereby generating shape pattern data corresponding to the shape of the work to be measured.

Thus, in the first form of the method of the present invention, a basic line such as a straight line or a curved line is made to "sweep", i.e., moved translationally or rotationally, so as to generate patterns of various shapes of measurement plane and the thus generated measurement plane shape patterns are suitably assembled to form a three-dimensional pattern, thus generating the shape pattern data which precisely conforms with the shape of the work which is to be produced and measured.

In the second form of the method of the present invention, a plurality of typical basic patterns are previously generated and registered. The registration of the patterns is made using the pattern sizes as parameters. Therefore, by suitably selecting the numerical values of the sizes as the pattern parameters, it is possible to enlarge or contract the basic patterns as desired, so that various desired measurement plate shape patterns are obtained. The thus obtained measurement plane shape patterns are suitably assembled to build up a three-dimensional pattern, thus generating the shape pattern data which precisely conforms with the shape of the work which is to be produced and measured.

BRIEF DESCRIPTION OF THE DRAWINGS

FIG. 3 is a plan view of an input panel of the input system;

FIGS. 4A to 4D are illustrations of shape patterns generated by a CAD part of the coordinate measuring instrument;

FIGS. 5A and 5B are illustrations of examples of method of generating shape patterns by the CAD part;

FIG. 6 is a perspective view of a shape pattern generated by an assembly processing the CAD part;

FIGS. 7A, 7B, and 7C are illustrations of methods of generating shape patterns by a parametric function of the CAD part;

DESCRIPTION OF THE PREFERRED EMBODIMENTS

The invention will become more clear from the following description of the preferred embodiments taken in conjunction with the accompanying drawings.

Figure 1:
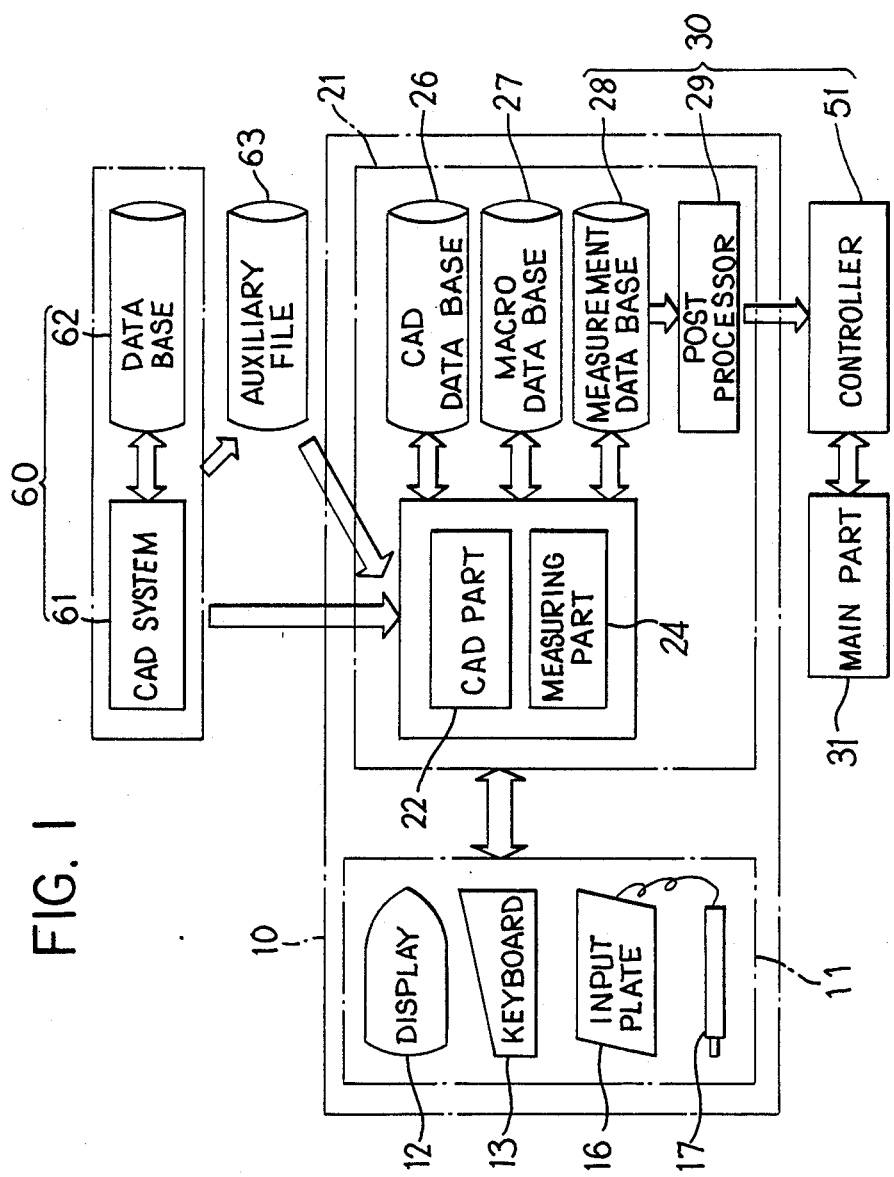
FIG. 1 is a diagrammatic illustration of the whole of a coordinate measuring instrument of the present invention.
Figure 10:
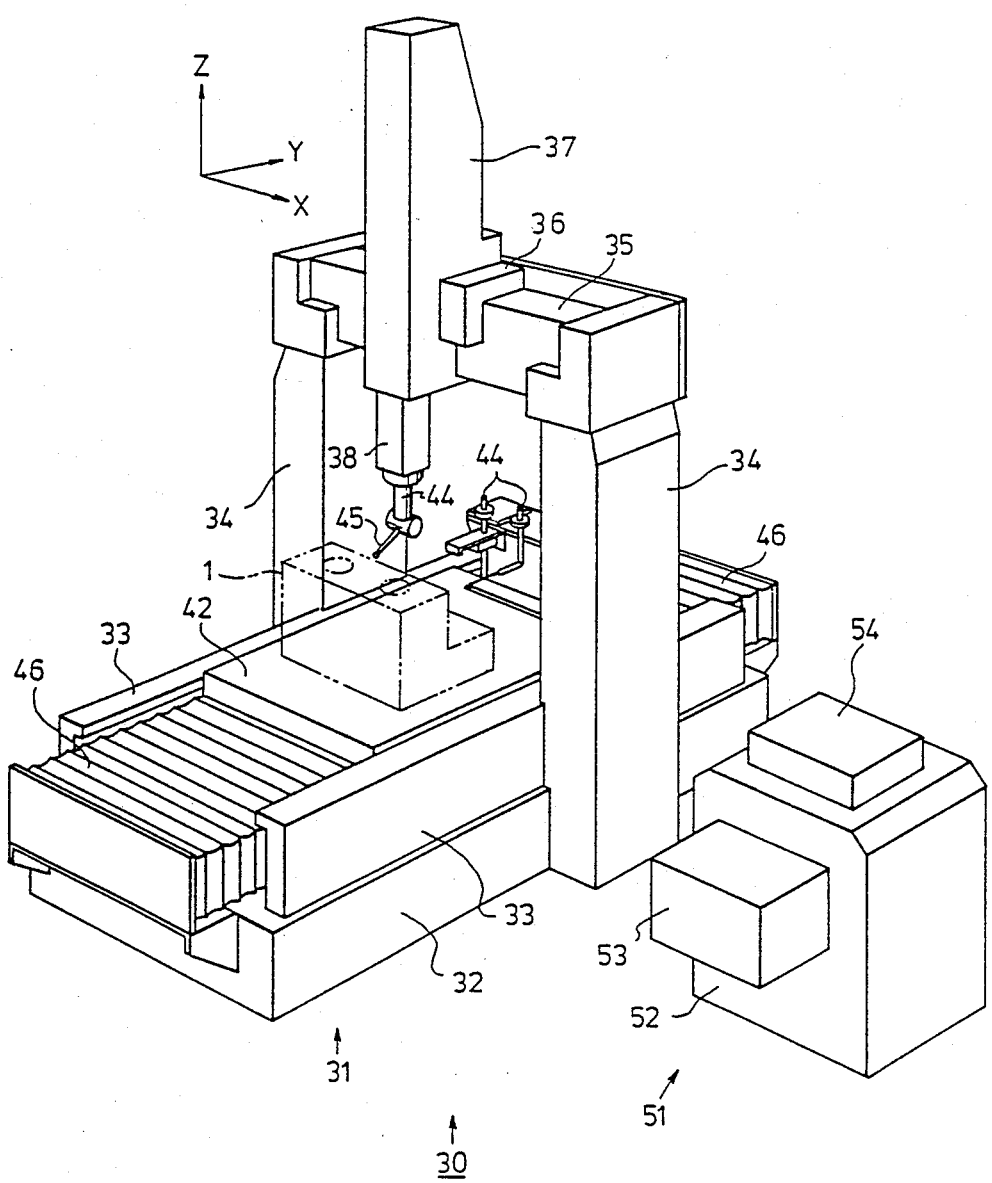
FIG. 10 is a perspective view of a known coordinate measuring instrument.

Referring first to FIG. 1, an embodiment of the coordinate measuring instrument of the present invention, generally denoted by 30, has a main part 31, a controller 51 and a measuring procedure instruction means 10. The coordinate measuring instrument also is provided with auxiliary means as means for inputting design data to the measuring procedure instruction means 10. The basic constructions of the main part 31 and the controller 51 are materially the same as those in the conventional instrument described before in connection with FIG. 10, so that the same parts are denoted by the same reference numerals as those appearing in FIG. 10, with detailed description thereof being abridged or omitted.

The measuring procedure instruction means 10, which constitutes a critical and essential feature of the present invention, is capable of generating and outputting measuring information, namely, data which enable the controller 51 to work out the measuring procedure program without requiring any actual measurement of a reference work. The measurement procedure instruction means is mainly constituted by two parts: namely, an input system 11 and a measurement supporting system 21.

The measurement supporting system 21 is composed of a CAD part 22 and a measuring part 24 which are united with each other integrally and organic manner as a central processing system, various data bases 26, 27, 28, and a post processor 29 connected to the controller 51.

The CAD part 22 has a pattern processing function which generates shape pattern data corresponding to the shape of the work 1 to be measured, through conversion of design data. Thus, the shape pattern conforming with the shape of the work to be measured can be obtained without requiring preparation of a reference work which is essentially required in the known coordinate measuring instrument for the purpose of working out the measuring procedure program. The CAD part 22 can function independently from the measuring part 24 which will be detailed later. Thus, the CAD part 22 is capable of generating measurement data base. More practically, the pattern processing function of the CAD part 22 includes various functions such as a three-dimensional shape pattern generating function, plane shape pattern generating function, parametric pattern generating function, tolerance attribute sub-function and so forth.

The plane shape generating function is to generate a plane shape pattern corresponding to a basic measurement plane, by conducting a sweeping with a basic line which may be straight or curved. For instance, the sweeping is effected by translationally moving a basic line 80 as shown in FIG. 5A, or by rotating the same as shown in FIG. 5B. The patterns shown in FIGS. 5A and 5B are only illustrative, and various two- and three-dimensional plane patterns as shown in FIGS. 4A to 4D can be generated by the plane shape pattern generating function. Although not shown in the drawings, the plane shape pattern generating function also includes a connection-type function which generates a plane shape pattern by connecting a plurality of points or lines. Thus, the sweeping type function and connection type function are used selectively or in combination.

The three-dimensional shape pattern generating function is to form a three-dimensional shape pattern corresponding to a work to be measured by, for example, suitably combining the plane shape patterns generated by the plane shape pattern generating function. For instance, the three-dimensional shape pattern generating function is capable of forming a pattern constituted by a combination of a parallelopiped shape 2 and the cylindrical shape 3, which simulates a parallelopiped work 2 with a cylindrical bore 3 of a diameter D, as shown in FIG. 6.

The actual work to be measured generally includes, wholly or partially, various portions of similar shapes though the sizes of such portions may vary. The parametric pattern generating function is intended for speed-up the programming operation by making use of such similarities between different portions of the work. According to this function, a plurality of basic patterns (parametric patterns) are registers with their sizes used as parameters, and the values of such parameters are suitably selected to enable similar patterns of different sizes to be generated. For instance, the parallelopiped body 2 as shown in FIG. 7A can be generated by registering a basic pattern having a rectangular form having a breadth b and a depth a and then appointing the length c. Similarly, a cylindrical body 3 as shown in FIG. 7B is generated by registering a circular or disk-shaped basic pattern of a predetermined diameter and then appointing the parameter z, i.e., the heightwise length. This function can also apply to a synthetic pattern which is synthesized from a plurality of basic patterns. Most of the basic patterns can be generated by the plane shape pattern generating function.

The tolerance attribute function is intended for the following purpose. Although any desired geometric pattern can be formed by suitably using various functions described before, such a geometric pattern may fail to precisely conform with the shape of the actual work to be measured. In such a case, the thus formed geometric pattern is modified by an easy introduction of size or angle tolerance peculiar to the shape of the work 1 or geometrical tolerances as specified in Japanese Industrial Standard (JIS). This introduction of the tolerances is conducted by the tolerance attribute function. Thus, a pattern obtained by the described functions can be used for all types of works the shapes and sizes of which vary within given tolerances, so that the necessity for working out the measuring program for each of such works can be eliminated. The tolerance attribute function also enables retrieval of tolerance data.

The measuring part 24 is operable independently from the CAD part 22 but is closely related to the latter. More specifically, the measuring part 24 generates measurement data including the path of relative movement between the probe sensor 45 and the work 1 to be measured, in accordance with measuring conditions input through the input system 11 such as the purpose of evaluation of measurement, positions of measuring points and number of measuring points, while making reference to shape patterns and tolerance information generated by the CAD part 22 in conformity with the shape of the work to be measured. Namely, the measurement data produced by the measuring part 24 is output to the controller 51 through a post processor 29, so as to enable the controller 51 to produce measurement data which is enough for forming a measuring procedure program equivalent to that formed by the conventional apparatus through, for example, playback method making use of a reference work.

Figure 8A:
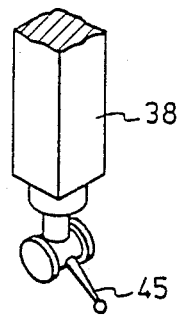
FIGS. 8A and 8B are perspective views of a probe sensor and a work to be measured.
Figure 8B:
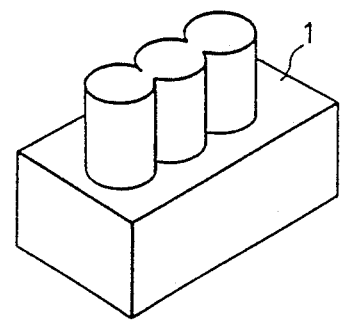

In particular, the measuring part 24 incorporated in this embodiment has various functions such as probe motion simulating function, automatic interference checking function, data editing function, automatic measuring point arranging function and measuring macro function. The probe motion simulating function is capable of outputting data such as the path of relative movement to the display 12 which is a part of the input system 11 for a visual confirmation and for correction of the path through a keyboard 13 as desired. The purpose of the automatic interference checking function is as follows. In general, a large number of measuring points well approximating 1000 is employed. In addition, the work 1 to be measured has a very complicated shape. Furthermore, it is often necessary to change the touch signal probe 44 with the probe sensor 45 to another one which has a different configuration. For these reasons, there is a risk for the probe sensor 45 and the work 1 to be interfered by each other during the actual measurement, however carefully the path of the relative movement may be determined. Such an interference may result in breakage of the probe sensor and, anyway, impedes the measuring operation. The interference is liable to occur particularly when the basic rule to minimize the speed and time of the relative movement between the work 1 and the probe sensor 45 is observed for the purpose of attaining a high measuring efficiency. In this embodiment, therefore, the automatic interference checking function is provided in which the three-dimensional pattern (shape pattern) generated by the CAD part 22 and corresponding to the shape of the work 1 to be measured, as well as the shape of the probe sensor, is substituted by simplified shape pattern, and the possibility of the interference between the probe sensor 45 and the work 1 is evaluated on the basis of the simplified shape pattern. This interference checking function will be described in more detail with reference to FIGS. 8A, 8B and 9A, 9B. FIGS. 8A shows the configuration of an actual probe assembly consisting of an actual probe sensor 45 and an actual spindle 38, while FIG. 8B shows the configuration of an actual work 1 to be measured. The configurations of the probe assembly and the work as shown in FIGS. 8A and 8B are respectively substituted by simplified configurations which are denoted by 8 and 9 in FIGS. 9A and 9B. The actual configurations as shown in FIGS. 8A and 8B have various convexities and concavities, and an impractically long time and much labor will be required if the possibility of interference is to be examined by copying all these convexities and concavities.

Figure 9A:
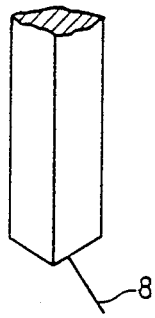
FIGS. 9A and 9B are illustrations of the probe sensor and the work after substitution, corresponding to those shown in FIGS. 8A and 8B.
Figure 9B:
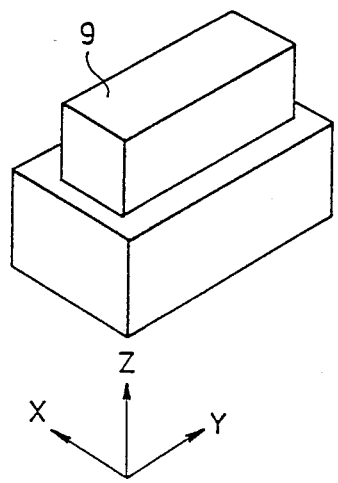

For instance, the shape of the actual probe sensor 45 is approximated by a line 8 (see FIG. 9A) which represents the axis of the probe sensor 45. On the other hand, the work 1 to be measured is approximated by a duplex parallelopiped body 9 having major surfaces parallel to X-, Y- and Z-axes. It will be seen that a safe, reliable and prompt interference check is possible when the simplified shapes as shown in FIGS. 9A and 9B are used in place of the actual shapes as shown in FIGS. 8A and 8B. The shapes to be substituted can freely be selected depending on the shape of the work 1 to be measured. The automatic measuring point arranging function used when there is a lot of measuring points. This function automatically determine the positions of the measuring points such that the probe sensor 45 and the work 1 to be measured are engaged with each other at positions which enables the shape of the work 1 to be measured with a high degree of precision. For instance, when it is desired to determine the diameter of the bore and the position of the axis of the same by three-point measurement, the automatic measuring point arranging function appoints three points at 120° interval on the inner periphery of the bore. The data editing function is to edit, in an appropriate manner, mostly in a time-series manner, the measured data generated independently or in groups. The measuring macro function is to register the procedure of measurement of the same or similar shapes as macros which are repeatedly usable so as to increase the speed of formation of the measured data. This function also permits registration of decision rules such as method of determination of positions and numbers of the measuring points which meets the measuring rule or standard peculiar to the user, as well as know-hows.

The CAD database 26, macro data base 27 and the measurement data base are used for the purpose of simplification and speed-up of the processing, as well as for functioning as memories.

Figure 2:
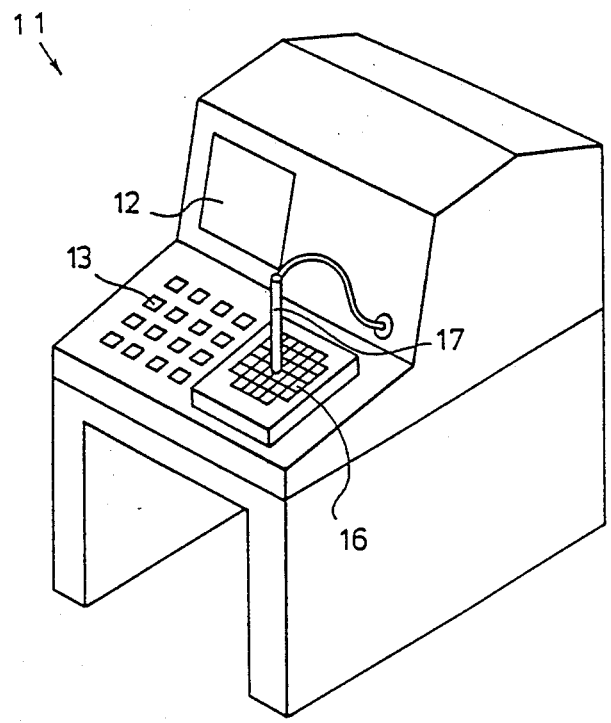
FIG. 2 is a schematic perspective view of an input system constituting a part of the coordinate measuring instrument of the present invention.

The input system 11 is a system which is interactive with the central processing system integrally including the CAD part 22 and the measuring part 24, and is used for enabling the user to select, appoint and set various dimensions and values for enabling the parts 22 and 24 to perform expected functions, as well as to confirm the result of the functioning of these parts 22, 24. As will be seen from FIGS. 1 and 2, the input system has a keyboard 13, input panel 16, and an input pen 17. Thus, the input system enables the user to set the object of evaluation of the measurement, positions and number of the measuring points, and so forth. The setting and other inputting functions available through the input panel 126 and the input pen 17 are shown in FIG. 3. It is also possible to directly hit the pattern which is displayed on the display 12.

The auxiliary means 60 includes a CAD system 61, database 62 and an auxiliary file 63 which are capable of managing various tasks concerning general design process and machining process. In the illustrated embodiment, design data expressed by numerals and symbols, i.e., data which is not given as practical pattern, is directly input to the coordinate measurement supporting system 21 through the auxiliary means. Detailed description is omitted in connection with the auxiliary means 60 since it does not contribute to any critical part of the measuring process and since it can be constituted by an ordinary commercially available device.

OPERATION

The operation of the embodiment will be explained hereinunder. For the purpose of simplification of the explanation, the following description will be concentrated mainly on structural factors, while omitting time factors.

(Setting)

The setting is possible through the input system in the measuring process instruction means 10. The practical setting operation is conducted through the keyboard 13, input panel 16 and the input pen 17, with or without assist of the display 12.

(1) Setting of measurement starting condition

When a new measuring data is to be formed, a declaration is input for making access to the corresponding data in the measurement data base 28, whereas, when editing such as addition or insertion is necessary, a declaration is input to make access to the existing data which is to be edited.

(2) Setting of basic condition

Basic conditions necessary for the measurement are selected and set such as the information concerning the types and other factors of the measuring instrument and probe sensor, coordinate information, tolerance class information, and so forth.

(3) Setting of object of measurement evaluation

The surface to be measured on the work is appointed, as well as the object of the measurement evaluation. Examples of the object are:
(a) Position, positional difference
(b) Distance (projection distance, spatial distance)
(c) Angle (actual angle, projection angle, spatial angle)
(d) Check-up of specific amounts (diameter, conical taper angle)
(e) Check-up of geometrical offset (degrees of straightness, flatness, and so forth)
(f) Check-up of position offset (degrees of parallelism, squareness and so forth)
(g) Check-up of deflection (circumferential deflection)

(4) Setting of measuring method

The following practical items are set and appointed, in order to determine the path of the relative movement between the probe sensor 45 and the work 1 to be measured which have been set in the previous steps.
(a) Setting of number of measuring points
(b) Setting of range of measurement
   The setting of the range of measurement is effective in dealing with extraordinary regions such as those having roll over, burr, crown and warp which may have been incurred in the course of processing.
(c) Determination and appointment of the measuring positions
(d) Instruction for guiding probe sensor
(e) Selection and appointment of interference checking function

(5) Editing of measurement information (Formation of shape pattern)

Design data (pattern image) is input from the auxiliary means 60 including the CAD system 61, by the operation of the input system 11. The input design data is suitably converted in accordance with the input through the input system by the pattern processing function (plane shape pattern generating function, coordinate shape pattern generating function, parametric pattern generating function and the tolerance attribute function) of the CAD part 22, whereby three-dimensional or coordinate shape patterns of the measurement planes corresponding to the shape of the work 1 are formed as the measurement data base, by means of the CAD part 22.

Namely, a registered basic line 80, which may be straight, curved or a combination of a straight line and a curved line, is translationally moved as shown in FIG. 5A or rotated as shown in FIG. 5B so as to form shape patterns by sweeping as shown in these Figures, as well as various measurement plane shape patterns as shown in FIGS. 4A to 4B, by the plane shape pattern generating function. Subsequently, a plurality of measurement plane shapes are suitably selected and combined by the three-dimensional shape pattern generating function, thereby to build and generate a three dimensional pattern corresponding to the shape of the work to be measured which is, for instance, a combination of a parallelopiped shape 2 and a cylindrical shape 3 as shown in FIG. 6. Thus, in the illustrated embodiment, it is possible to promptly build up the shape pattern data accurately corresponding to the shape of the work to be measured, by combining and assembling elementary measurement plane shape pattern which are easily formed by sweeping with a simple basic line 80.

When a part (measurement plane) or whole of the work 1 to be measured includes a plurality of portions of the same or similar shapes though the sizes may be different, it is possible to efficiently form a measurement plane shape pattern or three-dimensional shape pattern by making use of the parametric pattern generating function. For instance, various shapes can be obtained by setting a parameter such as a size of a registered basic pattern (parametric pattern). In the example shown in FIG. 7A, a parallelopiped body 2 ($a \times b \times c$) can be generated by setting the value of the parameter c for a basic pattern which is a rectangular plane of $a \times b$. Similarly, a cylindrical columnar body (or a cylindrical surface) can be generated by setting a parameter z for a basic pattern which is a disk 6 or a ring as shown in FIG. 7B. It is also possible to generate a complicated three-dimensional pattern such as that shown in FIG. 7C by combining a plurality of basic patterns such as those shown in FIGS. 7A and 7B.

(Production of Measurement Information)

The measurement information is produced by the measuring part 24 in accordance with the measuring conditions formed through the input system 11, with reference to data in the data bases 26, 27 and 28.

More specifically, the measuring part 24 cooperates with the CAD part 22 automatically determine the positions of the measuring points within the measuring range, in accordance with the set conditions such as the basic conditions, object of measurement evaluation, number of measuring points, range of measurement and so forth, in such a manner that the measuring points of the number set as explained before are available within the set range of measurement. At the same time, the measuring part 24 determines the path of relative movement between the probe sensor 45 and the work 1 (actually the pattern corresponding to work shape) to be measured. This path will be sometimes referred to as "probe path", hereinunder. The determination of the probe path is conducted efficiently by making use of intermediate routing planes such as an "initial plane". "retract plane" and so forth. It is also to be understood that a different measurement evaluation objects can be evaluated by a partial common use of a probe path, thus attaining a high efficiency of the operation. For the purpose of determining the probe path, it is effective to make use of a probe motion simulating function which in turn has an animation function. It is also possible to visually check the probe path by making use of a graphic display 12.

The thus obtained probe path has a high degree of reliability and practicality because the possibility of interference between the probe sensor 45 and the work 1 to be measured is checked along the probe path by the automatic interference checking function. The automatic checking function is capable of checking the possibility of interference over the whole of the probe path at once or in a stepped manner for a plurality of successive portions of the probe path. Static and dynamic checking operations also are possible by visual check and automatic computation, so that the possibility of interference can be efficiently checked for each of significant portions.

More specifically, a simple and quick checking (evaluation) of the probe path is possible by simplifying the simplifying the shapes of the probe and the work, e.g., by substituting the axis 8 of the probe sensor 45 and the combination of parallelopiped bodies 9 as shown in FIGS. 9A and 9B for the probe (including both touch signal probe 45; spindle 38) and the work 1 as shown in FIGS. 8A and 8B. It will be seen that the probe path length is minimized and the reliability of the probe path is ensured by substituting the complicated configuration consisting of three cylindrical portions shown in FIG. 8B by a parallelopiped body which contacts the outer peripheral surfaces of these three cylindrical portions.

Thus, the measuring procedure instruction means 10 conducts various editing operations such as alteration, deletion, insertion and so forth by making use of the time-series management of the measurement data so as to work out a practical measurement information. The thus obtained measurement data is converted by the CAD data base 26 into instructions in the form of signals suitable handling in the coordinate measuring instrument of the invention, and these instructions are delivered to the controller 51. In such a case, it is possible to instruct the measuring instrument in the measuring process, without necessitating storage of the measuring procedure program in the control unit 52.

As will be understood from the foregoing description, the described embodiment of the coordinate measuring instrument of the present invention enables a work 1 to be measured and examined accurately and rapidly in accordance with the measuring procedure instructed by the measuring procedure instruction means 10, without employing any reference work or an actual work 1 to be measured.

Thus, the described embodiment of the coordinate measuring instrument is provided with measuring procedure teaching means 10 which is capable of working out a measuring procedure optimum for each type of work, without necessitating preparation and measurement of a reference work or an actual work, with the result that the measurement and examination are conducted accurately and rapidly, thus eliminating disadvantages and inconveniences caused by the conventional arts such as wasteful use of time and human labor. The invention, therefore, greatly improves the production efficiency particularly in the case where a variety of types of products are to be produced in small lots, and enables the coordinate measuring instruments of this kind to be used in a wider field of industry.

The measuring procedure instruction means 10 is composed of the input system, 11 and the coordinate measurement supporting system 21, and is designed to operate in an interactive manner through the aid of, for example, the display 12, whereby the measurement information can be formed very efficiently. In addition, abstract pattern data of commercially available CAD systems, designed to achieve high efficiency in designing and processing patterns, an directly be used as the basic data in the coordinate measuring system of the present invention. By making use of such design data, it is possible to accomplish, with a high speed, a series of producing operations starting with design and ending in measurement and examination.

The coordinate measurement supporting system 21, composed of the CAD part 22 and the measuring part 24, is capable of forming the shape pattern corresponding to the shape of the work to be measured, directly from the design data by the functioning of the CAD part 22. In addition, since the CAD part 22 an operate independently from the measuring part 24, the formation of various three-dimensional shape patterns is conducted whenever desired, provided that the design data is available. On the other hand, the measuring part 24 efficiently and optimumly utilizes the practical patterns formed by the CAD part 22 so as to conduct various operations such as determination of positions of the measuring points, determination of the probe path and the checking of possibility of interference between the work and the probe. It is therefore possible to accomplish the measurement safely, reliably and with minimal time, while ensuring a high degree of measuring accuracy.

In the CAD part 22, various measurement plane shape patterns can be generated by sweeping with a basic line 80 or by appointment of values of parameters. A shape pattern data corresponding to the shape of the work to be measured can be obtained easily and rapidly by forming a three-dimensional pattern through suitably combining a plurality of measurement plane shape patterns. This remarkably enhances the merit of the measurement procedure instruction means, i.e., instruction or teaching of the measurement information for enabling the measurement procedure to be formed without using any reference work or an actual work.

The CAD part 22 can operate independently from the measuring part 24, and the measurement process instruction means 10 is capable of functioning separately from the controller 51. The formation of a variety of shape pattern data is always possible, even during actual measuring operation, by sweeping with a basic line or appointment of parameters of basic patterns, as well as by combining a plurality of shape patterns.

In addition to the possibility of determination of the probe path on the basis of the shape pattern data corresponding to the shape of the work to be measured, the coordinate measuring instrument of the invention can ensure a high reliability of the determined probe path without any risk for the probe to be interfered with the work to be measured, thanks to the pattern substituting function and the automatic interference checking function in the measuring part 24. This in turn enables the probe path to be determined with minimal path length, thus assuring a high efficiency of the operation for determining the probe path.

The automatic interference checking function, in cooperation with the pattern processing function of the CAD part 22, enables the most critical portion of the measurement information to be completed quickly, thus enhancing the advantage of the measuring procedure instruction means, i.e., the function for giving measurement instructions for enabling the measuring procedure to be programmed without necessitating the use of a reference work or an actual work.

In the described embodiment, the measuring procedure instruction means is constructed independently of the controller 52. However, considering that what is required is to provide a function which enables the measuring procedure program to be formed without necessitating the use of a reference or actual work, the measurement procedure instruction means 10 and the controller 51 may be constructed in a common hardware, though the described arrangement having independent constructions of the measurement procedure instruction means 10 and the controller 51 offers an advantage that a system can easily be formed in which the measurement information can be formed for a work while the controller 51 is conducting actual measuring operation on another type of work.

It is also to be noted that, while in the described embodiment the main part 31 is constructed to include a work table 42 which is movable, this arrangement is only illustrative and the invention can be embodied with various other types of arrangement provided that they can effect a three-dimensional movement of the probe sensor 45 and the work 1 to be measured. In addition, the probe sensor 45 may be of any type of mechanical or non-mechanical sensor capable of sensing the work 1, e.g., an optical sensor having an optical axis which can be directed towards the work, although the described embodiment employs a mechanical sensor integrally mounted on the touch signal probe 44. Furthermore, the use of general-purpose CAD/CAM system is not essential, because the essential requirement is that the measuring procedure instruction means can receive the necessary design data.

The basic line used in the generation of the shape pattern data, which is in the described embodiment an integral line composed of a straight line portion and a curved line portion, may be composed of two or more portions which are not connected or which are arranged in a pair.

The basic patterns illustrated in the drawings are only illustrative. The parameter of the basic pattern, which is illustrated as being the length of one side of a parallelopiped body, may be the size of other factors such as the length of the diagonal line.

The substitution of the probe sensor and the work by the axis 8 and the parallelopiped body 9 also is illustrative, and the substitutive forms may be determined suitably determined in accordance with various factors such as the probe path and the shape of the probe sensor, in such a manner as to avoid interference between the work to be measured and the probe sensor.

As will be understood from the foregoing description, the present invention provides a coordinate measuring instrument which is capable of promptly and accurately programming the measuring procedure by means of shape patterns corresponding to the shape of the work to be measured, without necessitating any reference or actual work to be measured. In addition, the coordinate measuring instrument of the invention is capable of very accurately and promptly measure the shape and size of such a work, in accordance with the programmed measuring procedure.

It will also be understood that the present invention in its another aspect provides a novel and efficient method for generating shape pattern data.

What is claimed is:

1. A coordinate measuring instrument, comprising:
   a main part which effects three-dimensional relative movement between a work to be measured and a probe sensor, and a controller which controls said main part in accordance with a predetermined procedure and which measures the shape and size of said work by moving said probe sensor according to a measuring procedure to a plurality of successive positions in each of which said sensor senses the position of a respective one of a plurality of points on an external surface of said work and by recording positional information for each of said points; and
   measuring procedure instruction means which includes input means for facilitating input into said measuring procedure instruction means of measuring condition parameters, which includes means for storing data representing a plurality of simple geometric shapes, which includes means for facilitating input into said measuring procedure instruction means of given design data for said work, and which includes a coordinate measurement supporting system having CAD means for generating shape pattern data representing a shape pattern corresponding to the shape of said work by selectively combining said geometric shapes based on said given design data, and having measuring means operatively coupled to said controller for generating, based on said shape pattern data generated by said CAD means and said measuring condition parameters from said input means, measurement information defining said measuring procedure for said controller, said measurement information including a definition of said plurality of positions and a definition of a path of movement for said probe sensor which causes said probe sensor to successively pass through each of said positions;
   whereby said measuring procedure is generated without actual physical measurement of a reference work.

2. A coordinate measuring instrument according to claim 1, wherein said measuring means uses said shape pattern, which is a simplified geometric representation of the actual shape of said work, as substitute work pattern data, and has substitute probe pattern data which includes a simplified geometric representation of the actual shape of said probe sensor, and wherein said measuring means includes automatic interference checking means for using said substitute work pattern data and said substitute probe pattern data to evaluate the possibility of interference between said probe sensor and said work during said relative movement thereof and for adjusting said path of movement so as to substantially avoid interference.

3. A coordinate measuring instrument according to claim 2, wherein said probe sensor includes an elongate probe element having a center axis, and wherein said substitute probe pattern data includes as a representation of said probe element a line segment representing the center axis of said probe element.

4. A coordinate measuring instrument according to claim 2, wherein said substitute work pattern includes a parallelopiped portion having surface planes which are each parallel to a respective axis of a three-dimensional Cartesian coordinate reference system.

5. A method of generating data representing a three-dimensional shape pattern from design data for a work to be measured by a coordinate measuring instrument which has measuring procedure instruction means for generating instructions specifying a measuring procedure based on said data representing said shape pattern, said method comprising the steps of:
generating data representing each of a plurality of measurement shape patterns by one of the steps of computing a sweep with a basic line through a translational motion and computing a rotation of said basic line about an axis; and
selectively combining said data representing respective said measurement shape patterns to build said three-dimensional shape pattern representing the shape of said work to be measured.

6. A method of generating shape pattern data according to claim 5, wherein said basic line is one of a straight line and a curved line.

7. A method of generating shape pattern data according to claim 5, wherein said basic line includes a straight line portion and a curved line portion.

8. A method of generating data representing a three-dimensional shape pattern from design data for a work to be measured by a coordinate measuring instrument which has measuring procedure instruction means for generating instructions specifying a measuring procedure based on said data representing said shape pattern, said method comprising the steps of:
generating and storing data representing a plurality of simple geometric patterns which each have a size parameter;
generating data representing respective measurement shape patterns by retrieving respective said simple geometric shape patterns corresponding to respective portions of said design data and by giving to each said size parameter of said retrieved patterns a definite value which is derived from said design data; and
combining said data representing said measurement shape patterns to build said three-dimensional shape pattern representing the shape of said work to be measured.

9. In a system which includes: controller means for effecting three-dimensional movement of a probe sensor along a path of travel relative to a work manufactured from design data, wherein said probe sensor moves successively through a plurality of respective sensing positions as it moves along said path of travel and senses in each said sensing position positional information for a respective one of a plurality of points on an external surface of said work; the improvement comprising: measurement instruction means for computing from said design data work image data representing a three-dimensional image of said work, for computing path data from said work image data and from probe image data representing a three-dimensional image of said probe sensor, said path data representing a three-dimensional path of movement of said image of said probe sensor relative to said image of said work which moves said image of said probe sensor successively to a plurality of predetermined sensing positions relative to said image of said work and which avoids engagement of said image of said probe sensor and said image of said work as said image of said probe sensor is moved between each successive pair of said sensing positions along said path of movement, and for transmitting to said controller means said calculated path data, said path data defining for said controller means said path of travel, said controller means effecting said movement of said probe sensor along said path of travel in response to said path data.

* * * * *